(12) United States Patent
Xu et al.

(10) Patent No.: US 12,344,804 B2
(45) Date of Patent: *Jul. 1, 2025

(54) RENEWABLE JET PRODUCTION

(71) Applicant: EXXONMOBIL TECHNOLOGY AND ENGINEERING COMPANY, Annandale, NJ (US)

(72) Inventors: Xiaochun Xu, Annandale, NJ (US); Madelyn M. Evans, Jersey City, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 47 days.

This patent is subject to a terminal disclaimer.

(21) Appl. No.: 18/165,631

(22) Filed: Feb. 7, 2023

(65) Prior Publication Data

US 2023/0416619 A1     Dec. 28, 2023

Related U.S. Application Data

(60) Provisional application No. 63/308,142, filed on Feb. 9, 2022.

(51) Int. Cl.
*C10G 65/08*     (2006.01)
*C10G 65/02*     (2006.01)
*C10G 65/12*     (2006.01)

(52) U.S. Cl.
CPC ...... *C10G 65/08* (2013.01); *C10G 2300/1011* (2013.01); *C10G 2300/301* (2013.01); *C10G 2300/4025* (2013.01); *C10G 2400/08* (2013.01)

(58) Field of Classification Search
None
See application file for complete search history.

(56) References Cited

U.S. PATENT DOCUMENTS

| | | | |
|---|---|---|---|
| 5,151,371 | A | 9/1992 | Quimby et al. |
| 6,759,438 | B2 | 7/2004 | Rainis et al. |
| 7,846,323 | B2 | 12/2010 | Abhari et al. |
| 8,193,399 | B2 | 6/2012 | Gosling |
| 8,304,591 | B2 | 11/2012 | Aulich et al. |

(Continued)

FOREIGN PATENT DOCUMENTS

| EP | 2 474 599 A1 | 7/2012 |
|---|---|---|
| WO | 2021/099343 A1 | 5/2021 |

OTHER PUBLICATIONS

International Search Report and Written Opinion received for PCT Patent Application No. PCT/US2023/062119, mailed on May 30, 2023, 11 pages.

*Primary Examiner* — Tam M Nguyen
(74) *Attorney, Agent, or Firm* — Shook, Hardy & Bacon L.L.P.

(57) ABSTRACT

Systems and methods are provided for production of renewable jet fuel and/or jet fuel blending component fractions. The systems and methods provide for formation of jet boiling range fractions via hydrodeoxygenation and catalytic dewaxing of bio-derived feeds. The systems and methods for reducing or minimizing recycle and/or forming only a jet boiling range product and a lower boiling range product can be facilitated based on selection of a suitable feedstock and/or based on selection of suitable reaction conditions and catalyst for the catalytic dewaxing.

19 Claims, 1 Drawing Sheet

(56) References Cited

U.S. PATENT DOCUMENTS

| | | |
|---|---|---|
| 8,314,274 B2 | 11/2012 | Marker et al. |
| 8,431,756 B2 | 4/2013 | Roberts et al. |
| 8,523,959 B2 | 9/2013 | O'Rear |
| 8,674,160 B2 | 3/2014 | Hanks et al. |
| 8,729,330 B2 | 5/2014 | Hanks et al. |
| 8,742,183 B2 | 6/2014 | McCall et al. |
| 9,617,479 B2 | 4/2017 | Fingland et al. |
| 10,000,712 B2 | 6/2018 | Novak et al. |
| 10,053,639 B2 | 8/2018 | Shih et al. |
| 2008/0066374 A1 | 3/2008 | Herskowitz |
| 2009/0158637 A1 | 6/2009 | McCall et al. |
| 2009/0287029 A1 | 11/2009 | Anumakonda et al. |
| 2021/0395620 A1 | 12/2021 | Andersson et al. |
| 2023/0250348 A1* | 8/2023 | Xu ............................ C10L 1/08 585/14 |

* cited by examiner

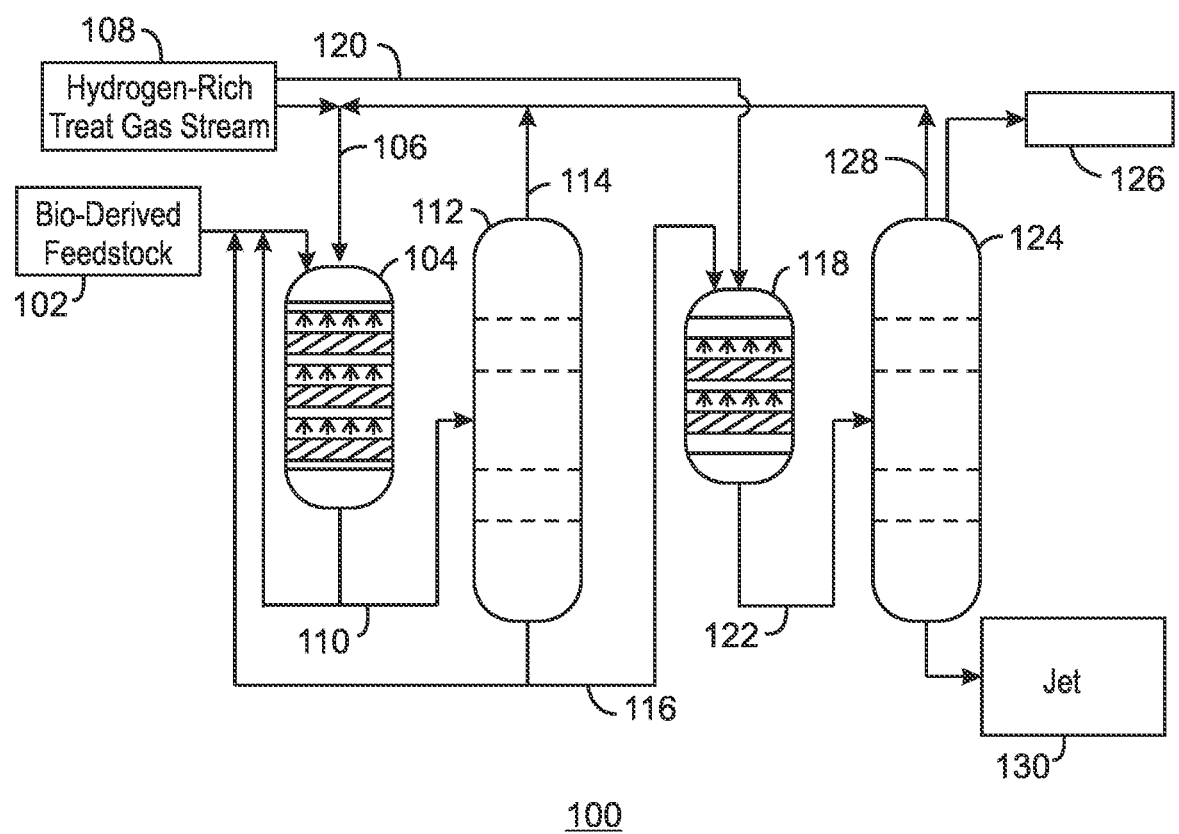

RENEWABLE JET PRODUCTION

CROSS-REFERENCE TO RELATED APPLICATIONS

This non-provisional patent application claims priority to U.S. provisional patent app. No. 63/308,142, filed Feb. 9, 2022, and titled "RENEWABLE JET PRODUCTION," the entire contents of which is incorporated herein by reference.

FIELD OF THE INVENTION

Systems and methods are provided for production of renewable jet fractions.

BACKGROUND OF THE INVENTION

The aviation industry is looking for increasingly sustainable sources of jet fuel to lower the carbon intensity of the fuel consumed during flight. While the aviation industry today contributes 2-3% of global $CO_2$ emissions, this is expected to increase with the anticipated growth of the aviation sector over the next 30 years. There are a number of sustainable aviation fuel pathways that have been approved for use in commercial aviation.

Increased production of sustainable diesel fuel is also of general interest. Some renewable diesel products are already commercially available.

Renewable jet production is typically a multi-step process: either single stage or two stage. In a first step, triglycerides, FAME, FFA are hydrotreated with conventional hydrotreating catalysts under typical hydrotreating conditions to convert fatty acid chains to n-paraffins. The resulting n-paraffins are then exposed to a combination of dewaxing and cracking conditions (either as a single step or a plurality of steps) to form a hydroprocessed effluent. The hydroprocessed effluent is then fractionated to produce naphtha, jet, and diesel boiling range fractions.

Conventional methods for production of renewable jet generally use one of two types of strategies. In one strategy, the goal is to primarily make renewable jet fuel. Under this strategy, both cracking and isomerization are purposely performed on the feedstock, so that the resulting average carbon chain is both isomerized and reduced in chain length. The other type of strategy is to make both jet and diesel during a single process. Under this type of strategy, a fractionation or multi-stage separation is used to separate naphtha, jet, and diesel boiling range fractions from the liquid products. In this type of strategy, cracking is not necessarily performed. However, the cut point for separation between the jet and diesel fractions is set relatively low to avoid difficulties with meeting the freezing point limitations that are often included in the specification for a jet fuel.

The carbon chain length distribution for a renewable jet fraction typically shows that $C_{11}$-$C_{12}$ carbon chains are the most common molecular size in the renewable jet fraction. This is in contrast to a typical conventional jet fuel derived from mineral sources, where the molecular size distribution usually has a peak for $C_{13}$-$C_{14}$ chain lengths.

U.S. Pat. No. 7,846,323 describes a system and method for converting a bio-derived feed to form a jet fuel fraction. The bio-derived feed is hydrotreated along with a recycle stream to form a hydrotreated effluent. The $C_{16+}$ portion of the effluent is then passed into a hydroisomerization reactor. The resulting hydroisomerization effluent is then used as the recycled portion of the feed to the hydrotreater. The specification recites a temperature for hydroisomerization of 580° F. to 680° F. (304° C. to 360° C.). However, the only example provided in the specification actually uses a hydroisomerization temperature of 685° F. (363° C.).

U.S. Pat. No. 8,193,399 describes a system and method for converting a bio-derived feed to form a jet and a diesel fraction. The bio-derived feed is introduced into an initial deoxygenation (hydrotreatment) stage, along with a sufficient amount of a recycled product stream to improve hydrogen solubility, so that low pressure operation can be performed. After deoxygenation, the deoxygenated liquid effluent is exposed to both isomerization and hydrocracking conditions. Both a diesel product and a jet product are the separated from the isomerized and hydrocracked effluent. A portion of one or both of these products is used to provide the recycle stream.

U.S. Pat. No. 8,304,591 is directed to forming renewable fuels from bio-derived sources of fatty acids (such as glycerides) that include carbon chains containing no more than 16 carbon atoms.

U.S. Pat. Nos. 8,314,274 and 8,742,183 describe methods for converting a bio-derived feed to form a jet and a diesel fraction. After hydrotreatment to remove oxygen, the feed is hydroisomerized and hydrocracked. The hydrocracking and hydroisomerization can be performed as a single step if an appropriate catalyst is selected. Otherwise, separate cracking and hydroisomerization steps are performed.

U.S. Pat. No. 8,431,756 describes processing a bio-derived feed that still includes a substantial oxygen content with a dewaxing catalyst in order to deoxygenate and/or isomerize the feed.

U.S. Pat. No. 8,523,959 describes processing a triglyceride-containing feed via partial hydrodeoxygenation and optionally hydroisomerization to form fuels. The resulting fuels include an oxygen content of 0.001 wt % (10 wppm) or more. It is noted that the constraint of retaining oxygen in the final product limits the amount of hydroprocessing that can be performed on the feed, due to the relative ease with which oxygen is removed during any type of hydroprocessing.

U.S. Pat. Nos. 8,674,160 and 10,000,712 describe general hydroprocessing of a wide range of bio-derived feedstocks to form diesel fuels with improved cold flow properties.

U.S. Pat. No. 8,729,330 describes exposing mixtures of a bio-derived feed having substantial oxygen content and a mineral feed to a dewaxing/isomerization catalyst.

U.S. Pat. No. 9,617,479 describes hydrodeoxygenation of a wide range of triglyceride-containing feeds under conditions that preserve oxygen and/or olefin content in the feed during hydrodeoxygenation. This can allow for recovery of increased amounts of propylene versus propane when processing triglycerides. The resulting hydrodeoxygenated product can undergo further hydroprocessing.

U.S. Pat. No. 10,053,639 describes producing both a jet fuel product and a diesel fuel product from a feedstock. The feedstock can optionally include a bio-derived portion.

U.S. Patent Application Publication 2008/0066374 describes processing of bio-derived feeds over catalysts including both a catalytic metal function and an acidic function to form diesel fuels. Several examples of processing of soybean oil are provided.

International Publication WO 2021/099343 describes processing bio-derived feeds containing $C_{12}$ to $C_{24}$ hydrocarbons to form a renewable hydrocarbon composition for use as a jet fuel blending component. The feed is hydrodeoxygenated and hydroisomerized. The resulting hydroprocessed effluent is then typically fractionated to separate heavier (i.e., diesel) boiling range components from a jet boiling range fraction. The hydrocarbon composition is described as having an average carbon number of 14.3 to 15.1. This is apparently achieved by having more than 60 wt % of the hydrocarbon composition correspond to $C_{14}$ to $C_{17}$ hydrocarbons.

U.S. Pat. Nos. 6,759,438 and 5,151,371 describe a technique for performing gas chromatography-atomic emission detection (GC-AED)

SUMMARY

In an aspect, a method for producing a renewable jet boiling range fraction is provided. The method includes contacting a bio-derived feedstock with a hydrotreatment catalyst under effective hydrotreatment conditions to produce a deoxygenated effluent containing a deoxygenated liquid fraction. The method further includes contacting at least a portion of the deoxygenated liquid fraction with a dewaxing catalyst including a 10-member ring, one-dimensional zeotype framework structure and Pt, Pd, or a combination thereof under effective dewaxing conditions including a weighted average bed temperature of 300° C. or more to produce an isomerized effluent. Additionally, the method includes separating the isomerized effluent to form a jet boiling range fraction as a bottoms fraction and one or more lower boiling fractions, the jet boiling range fraction having a T90 distillation point of 300° C. or less, a freeze point of −40° C. or less, and a flash point of 38° C. or more.

BRIEF DESCRIPTION OF THE DRAWINGS

The FIGURE shows an example of a reaction system for producing a renewable jet boiling range fraction.

DETAILED DESCRIPTION

Overview

In various aspects, systems and methods are provided for production of renewable jet fuel and/or jet fuel blending component fractions. The systems and methods provide for formation of jet boiling range fractions via hydrodeoxygenation and catalytic dewaxing of bio-derived feeds. In some aspects, the systems and methods can allow for production of a jet boiling range fraction while avoiding the need to perform a multi-product separation on the product effluent, so that one or more light ends fractions (e.g., LPG, butane), a naphtha fraction, a jet fraction, and a diesel fraction are formed. Instead, the product effluent can be separated into a first fraction corresponding to naphtha and lower boiling range compounds and a second fraction corresponding to a jet boiling range fraction. Additionally or alternately, in some aspects the systems and methods can allow for production of a jet boiling range fraction while reducing or minimizing the need to recycle a heavy portion of the dewaxed product effluent. In such aspects, the only (optional) liquid recycle that is performed is recycle of hydrodeoxygenated effluent from the first processing stage back to the entrance of the first processing stage to provide temperature control during the hydrodeoxygenation process. In various aspects, the systems and methods for reducing or minimizing recycle and/or forming only a jet boiling range product and a lower boiling range product can be facilitated based on selection of a suitable feedstock and/or based on selection of suitable reaction conditions and catalyst for the catalytic dewaxing.

Based on conventional strategies for production of renewable jet boiling range fractions, the yield of jet boiling range products from the input feed to the dewaxing stage is typically limited to 70 wt % or less relative to the initial weight of the input feed. This can be due to conversion (cracking) of jet boiling range components to lower boiling components, fractionation of portions of the products that potentially could be jet boiling range components into a diesel boiling range fraction, or a combination thereof. Due in part to the limited availability of renewable feedstocks for jet boiling range production, even marginal increases in yield can be beneficial for increasing the supply of renewable jet boiling range fractions. While some increases in yield can be achieved by recycling a diesel portion of a product for further cracking, this incurs the additional operating expenses and capital costs. In particular, having a diesel recycle stream requires at least a) a recycle loop and corresponding pumps/compressors for returning the diesel product back to an earlier process stages, and b) a fractionation tower or other multi-stage separation scheme to separate three or more components from the product stream (i.e., at least a diesel boiling range fraction, a jet boiling range fraction, and a naphtha/lower boiling range fraction).

In various aspects, a simplified reaction system for producing renewable jet boiling range products is provided. The simplified reaction system can process renewable feedstocks without requiring separation of a diesel boiling range fraction from the dewaxing effluent. In other words, a jet boiling range fraction of the dewaxing effluent can correspond to the "bottoms" or highest boiling fraction from the separation. The system can include a hydrotreatment stage for deoxygenation of the feedstock and a catalytic dewaxing stage for isomerization of the resulting deoxygenated feedstock. This can be achieved in part by processing a renewable feedstock under dewaxing conditions that allow for sufficient dewaxing to form jet boiling range products with desirable properties (including desirable cold flow properties). These dewaxing conditions can be paired with use of a ZSM-48 based dewaxing catalyst that can facilitate isomerization of the feedstock while reducing or minimizing cracking.

The above system and methodology can be used in combination with a renewable feedstock that has a reduced or minimized content of $C_{19+}$ carbon chains. Although n-$C_{17}$ and n-$C_{18}$ paraffins having boiling points above 300° C., branched $C_{17}$ and $C_{18}$ paraffins (i.e., isoparaffins) have boiling points below 300° C. As a result, if sufficiently deep dewaxing is performed on a feedstock, substantially all of the $C_{17}$ and $C_{18}$ paraffins can be retained in a jet boiling range product. By reducing or minimizing the $C_{19+}$ paraffins present in a feedstock, any $C_{19+}$ paraffins can either be cracked during the isomerization, or can be in sufficiently small quantities that a target final boiling point of 300° C. can be achieved by blending with other jet boiling range fractions.

In some aspects, additional benefits can be achieved by selecting the dewaxing conditions within a relatively narrow range. In addition to providing sufficiently severe conditions to cause deep dewaxing of the feed, the conditions can also be mild enough to avoid unnecessary cracking of the feedstock. This can allow for production of jet boiling range fractions in yields of 70 wt % or more relative to a weight of the input feed to the dewaxing stage.

In some aspects, still further benefits can be achieved by using a feedstock with a somewhat unusual profile. In particular, a feedstock can be selected so that the triglycerides, free fatty acids, and/or other renewable feeds in the feedstock have an elevated content of $C_{17}$ and $C_{18}$ chain lengths. Conventional renewable jet fractions typically have a peak in the distribution of carbon chain lengths for carbon chains containing 11 or 12 carbons. For such conventional feedstocks, the content of $C_{17+}$ hydrocarbons in the jet boiling range fraction can be relatively low, such as 15 wt % or less. By contrast, by using a feedstock with an elevated content of $C_{17}$ and $C_{18}$ components, a renewable jet boiling range product can be formed where 30 wt % or more of the jet boiling range product corresponds to $C_{17+}$ hydrocarbons, or 40 wt % or more, or 50 wt % or more, such as up to 70 wt % or possibly still higher. It is noted that while the content of $C_{17}$ and $C_{18}$ hydrocarbons is elevated, the content of $C_{14}$-$C_{17}$ hydrocarbons can remain be 50 wt % or less of the weight of the jet boiling range product, or 45 wt % or less, or 40 wt % or less.

Definitions

The "cloud point" of an oil is the temperature below which paraffin wax or other solid substances begin to crystallize or separate from the solution, imparting a cloudy appearance to the oil when the oil is chilled under prescribed conditions. Cloud point can be determined according to ASTM D7346.

The "freeze point" of a fraction (such as a feed or product) can be determined according to ASTM D5972. The "flash point" of a fraction can be determined according to ASTM D6450.

Unless otherwise specified, the "Liquid Hourly Space Velocity (LHSV)" for a feed or portion of a feed to a reactor is defined as the volume of feed per hour relative to the volume of catalyst in the reactor. In some specific instances, a liquid hourly space velocity may be specified relative to a specific catalyst within a reactor that contains multiple catalyst beds.

As used herein, the term "renewable diesel" refers to a hydrocarbon product produced from bio-derived feedstocks. Similarly, "renewable jet" refers to a hydrocarbon product produced from bio-derived feedstocks. Examples of typical feedstocks for renewable diesel production include diglycerides, monoglycerides, triglycerides, fatty acid methyl esters (FAME), free fatty acids, and the like, which are often derived from plant oils, animal fats, or algae oils. Relatedly, the term "bio-diesel" generally refers to fatty acid alkyl esters, such as FAME.

In this discussion, a "Cx" hydrocarbon refers to a hydrocarbon compound that includes "x" number of carbons in the compound. A stream containing "Cx-Cy" hydrocarbons refers to a stream composed of one or more hydrocarbon compounds that includes at least "x" carbons and no more than "y" carbons in the compound. It is noted that a stream containing "Cx-Cy" hydrocarbons may also include other types of hydrocarbons, unless otherwise specified.

In this discussion, "Tx" refers to the temperature at which a weight fraction "x" of a sample can be boiled or distilled. For example, if 40 wt % of a sample has a boiling point of 350° F. or less, the sample can be described as having a T40 distillation point of 350° F. In this discussion, boiling points can be determined by a convenient method based on the boiling range of the sample. This can correspond to ASTM D86. In the event that ASTM D86 cannot be performed on a sample due to the nature of the sample, ASTM D2887 may be used instead.

In various aspects of the invention, reference may be made to one or more types of fractions generated during distillation of a feedstock, intermediate product, and/or final product. Such fractions may include naphtha fractions and distillate fuel fractions. Each of these fractions can be defined based on a boiling range, such as a boiling range that includes at least 80 wt % of the fraction, or at least 90 wt % of the fraction. For example, for naphtha fractions, at least 80 wt % of the fraction, or at least 90 wt % of the fraction, can have a boiling point in the range of 85° F. (29° C.) to 300° F. (149° C.). It is noted that 29° C. roughly corresponds to the boiling point of isopentane, a C5 hydrocarbon. Fractions boiling below the naphtha range can sometimes be referred to as light ends. For a jet boiling range fraction 80 wt % or more of the fraction, or 90 wt % or more, can have a boiling point in the range of 149° C. to 300° C.

Another option for specifying various types of boiling ranges can be based on a combination of T5 (or T10) and T95 (or T90) distillation points. For example, in some embodiments, having at least 80 wt % (or at least 90 wt %) of a fraction boil in the naphtha boiling range can correspond to having a T10 distillation point (or T5 distillation point) of 29° C. or more and a T90 distillation point (or T95 distillation point) of 149° C. or less. For a jet boiling range fraction, the T10 distillation point can be between 149° C. and 205° C., while the T90 distillation point can be 300° C. or less. In some aspects, a jet boiling range fraction can also have a final boiling point (as measured by ASTM D86) of 300° C. or less.

In this discussion, reference may be made to gas or vapor portions of an effluent or product versus liquid portions of an effluent or product. In this discussion, a gas product portion or gas effluent portion refers to an effluent portion or product portion that would be in the gas phase at 20° C. and 100 kPa-a. Similarly, a liquid product portion or liquid effluent portion refers to an effluent portion or product portion that would be in the liquid phase at 20° C. and 100 kPa-a. In this discussion, when describing the current state of an effluent portion or product portion (such as the state of a portion or fraction under the conditions present at the exit from a reaction stage), the effluent portion or product portion is described as being in the gas phase or as being in the liquid phase. For example, due to the elevated temperature and pressure in a hydroprocessing stage (such as a hydrotreating stage or a dewaxing stage), the liquid effluent portion of the hydroprocessing effluent may be present partially or entirely in the gas phase.

Certain aspects and features are described herein using a set of numerical upper limits and a set of numerical lower limits. It should be appreciated that ranges from any lower limit to any upper limit are contemplated unless otherwise indicated. All numerical values are "about" or "approximately" the indicated value, and account for experimental errors and variations that would be expected by a person having ordinary skill in the art.

In this discussion, if it is necessary to determine the oxygen content of a sample, the oxygen content can be determined using gas chromatography—atomic emission detection (GC-AED) The basic GC-AED method starts by passing a sample for analysis, such as a deoxygenated jet boiling range fraction, through a gas chromatography system to separate the components of the sample. The resulting separation stream from the gas chromatograph can then be passed into an atomic emission spectrometer with plasma-excitation capability, along with an inert (carrier) gas and a carbon-containing gas (such as methane). A plasma is then formed from the mixture, followed by detection of oxygen in the plasma. Examples of this method are described in U.S. Pat. Nos. 6,759,438 and 5,151,371, which are incorporated by reference herein for the limited purpose of describing the GC-AED analytical technique. A standard spectrometer for GC-AED may be used to monitor oxygen concentration.

Feedstock

In various aspects, jet boiling range fractions can be formed from any convenient type of bio-derived feedstock, where the term "bio-derived feedstock" refers to a hydrocarbon feedstock derived from a biological raw material source, such as vegetable, animal, fish, and/or algae. For example, suitable feedstocks include diglycerides, monoglycerides, triglycerides, fatty acid methyl esters (FAME), free fatty acids, and the like, derived from plant oils, animal fats, or algae oils. In some aspects, a feedstock can be pretreated to remove metals, gums, and other contaminants (such as refined, bleached, and deodorized (RBD) grade vegetable oil).

As used herein, the term "vegetable oil" (or "vegetable fat") refers generally to any plant-based material and can include fats/oils derived from plant sources, such as plants of the genus *Jatropha*. Generally, the biological sources used for the bio-derived feedstock can include vegetable oils/fats, animal oils/fats, fish oils, pyrolysis oils, and/or algae lipids/oils, as well as any components of such biological sources. In some embodiments, the biological sources specifically include one or more types of lipid compounds, where the term "lipid compound" generally refers to a biological compound that is insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils, and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes. In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used according to embodiments described herein include, but are not limited to, rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil, and rice bran oil. According to embodiments described herein, vegetable oils can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used according to embodiments described herein include, but are not limited to, beef fat (tallow), hog fat (lard), turkey fat, fish fat/oil, and chicken fat. The animal fats can be obtained from any suitable source, including restaurants and meat production facilities. According to embodiments described herein, animal fats can also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on the total weight of the biomass itself. Algal sources for algae oils include, but are not limited to, unicellular and multicellular algae. Examples of such algae include rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Tetraselmis chui*, and *Chlamydomonas reinhardtii*.

Moreover, according to embodiments described herein, the bio-derived feedstock can include any feedstock that consists primarily of triglycerides and free fatty acids (FFAs). The triglycerides and FFAs typically contain aliphatic hydrocarbon chains in their structure having from 8 to 36 carbons, or preferably from 10 to 26 carbons, or most preferably from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can consist of $C_{10}$ to $C_{26}$ fatty acid constituents, based on the total triglyceride present in the lipid material.

Furthermore, a triglyceride is a molecule having a structure substantially identical to the reaction product of glycerol and three fatty acids. Thus, although a triglyceride is described herein as consisting of fatty acids, it should be understood that the fatty acid component does not necessarily contain a carboxylic acid hydrogen. In one embodiment, a majority of triglycerides present in the biocomponent feed can preferably consist of $C_{12}$ to $C_{18}$ fatty acid constituents, based on the total triglyceride content. Other types of feeds that are derived from biological raw material components can include fatty acid esters, such as fatty acid alkyl esters (e.g., FAME and/or FAEE).

In some aspects, the feedstock can correspond to a feedstock that contains a reduced or minimized content of $C_{19+}$ carbon chains (i.e., a reduced or minimized content of glycerides and/or fatty acid esters and/or free fatty acids that have carbon chains of 19 carbons or more). By reducing or minimizing the amount of $C_{19+}$ carbon chains in the feedstock, the number of $C_{19}$ paraffins in the resulting product are also reduced or minimized. This can be beneficial for forming a jet boiling range fraction without using a separation to remove diesel boiling range components. In such aspects, the feedstock can include 5.0 wt % or less of $C_{19+}$ carbon chains, or 3.0 wt % or less, or 1.0 wt % or less, or 0.1 wt % or less, such as down to having substantially no $C_{19+}$ carbon chains (0.01 wt % or less). It is noted that a diglyceride contains two separate carbon chains while a triglyceride includes three separate carbon chains. Thus, in feedstocks containing diglycerides and/or triglycerides, the weight of each carbon chain in a triglyceride is considered separately. For example, if a triglyceride contains one $C_{19}$ carbon chain and two $C_{18}$ carbon chains, only the weight of the $C_{19}$ carbon chain would be considered (and not the weight of the triglyceride) when calculating the weight of $C_{19+}$ carbon chains in the feedstock.

In some further aspects, the feedstock can include 50 wt % or more of $C_{17}$-$C_{18}$ carbon chains, or 60 wt % or more, or 70 wt % or more, or 80 wt % or more, or 90 wt % or more, such as up to substantially all of the feedstock corresponding to $C_{17}$-$C_{18}$ carbon chains. In such aspects, having a feedstock with an elevated content of $C_{17}$-$C_{18}$ carbon chains can be beneficial for forming a high density, high energy content jet boiling range fraction while still having final boiling point for the fraction that is below 300° C.

Hydrotreatment for Hydrodeoxygenation

In various aspects, the bio-derived feedstock can be exposed to hydrotreatment conditions for deoxygenation of the feedstock. The hydrotreatment can be performed in any convenient type of hydrotreatment reactor, such as fixed bed or trickle-bed reactor.

A hydrotreatment catalyst can contain at least one of Group VIB and/or Group VIII metals, optionally on a support such as alumina or silica. Examples include, but are not limited to, NiMo, CoMo, and NiW supported catalysts. In some embodiments, NiMo and Mo on alumina are preferred catalysts.

hydrotreatment conditions can be selected according to the details of each specific implementation. In a preferred embodiment, the hydrotreatment conditions include a total pressure of 200 psig to 2000 psig (~1.4 MPa-g to 14 MPa-g), a weighted average bed temperature (WABT) of 260° C. (i.e., 500° F.) to 400° C. (i.e., 752° F.), a hydrogen-rich treat gas rate of 200 standard cubic feet of gas per barrel of feedstock (scf/bbl) to 10,000 scf/bbl (~34 $Nm^3/m^3$ to 1700 $Nm^3/m^3$), and a liquid hourly space velocity (LHSV) of about 0.1 $hr^{-1}$ to about 10.0 $hr^{-1}$. In some aspects, the oxygen content of the resulting hydrotreated feedstock is less than about 0.4 wt % or less than about 0.1 wt % such as down to having substantially no oxygen content (less than 1.0 wppm). Without being bound by any particular theory, it is believed that residual oxygenates in the hydrotreated feedstock convert to $H_2O$ and CO during the deep dewaxing process, thus inhibiting the isomerization activity of the isomerization/dewaxing catalyst.

Optionally, a hydrotreatment reactor can be used that operates at a relatively low total pressure values, such as total pressures of about 200 psig (1.4 MPag) to about 800 psig (5.5 MPag). For example, the pressure in a stage in the hydrotreatment reactor can be at least about 200 psig (1.4 MPag), or at least about 300 psig (2.1 MPag), or at least about 400 psig (2.8 MPag), or at least about 450 psig (3.1 MPag). The pressure in a stage in the hydrotreatment reactor can be about 800 psig (5.5 MPag) or less, or about 700 psig (4.8 MPag) or less, or about 600 psig (4.1 MPa) or less.

In some embodiments, the sulfur and nitrogen contents of the feedstock may be advantageously reduced during the hydrotreatment process. For example, in some embodiments, the hydrotreatment process reduces the sulfur content of the feedstock to a suitable level, such as, for example, less than about 100 weight parts per million (wppm), less than about 50 wppm, less than about 30 wppm, less than about 25 wppm, less than about 20 wppm, less than about 15 wppm, or less than about 10 wppm, such as down to 0.1 wppm or possibly still lower. With regard to nitrogen, in some embodiments, the hydrotreatment process reduces the nitrogen content of the feedstock to a suitable level, such as, for example, about 30 wppm or less, about 25 wppm or less, about 20 wppm or less, about 15 wppm or less, about 10 wppm or less, about 5 wppm or less, or about 3 wppm or less, such as down to 0.1 wppm or possibly still lower.

In various embodiments, the hydrotreatment process is also used to deoxygenate the feedstock. Deoxygenating the feedstock may help to avoid problems with catalyst poisoning or deactivation due to the creation of water ($H_2O$) or carbon oxides (e.g., CO and $CO_2$) during catalytic dewaxing. Accordingly, the hydrotreatment process can be used to remove, for example, at least 90%, at least 95%, at least 98%, at least 99%, at least 99.5%, at least 99.9%, or completely (measurably) all of the oxygen present in the deoxygenated feedstock. Alternatively, the oxygenate level of the feedstock can be reduced to, for example, 0.1 wt % or less, 0.05 wt % or less, 0.03 wt % or less, 0.02 wt % or less, 0.01 wt % or less, 0.005 wt % or less, 0.003 wt % or less, 0.002 wt % or less, or 0.001 wt % (10 wppm) or less, such as down to having substantially no oxygen content remaining in the deoxygenated feedstock (less than 1.0 wppm).

In aspects where the feedstock for hydrotreatment includes a sufficiently high content of components having a $C_{17+}$ carbon chain, the resulting deoxygenated effluent can have a correspondingly high content of $C_{17+}$ n-paraffins. In such aspects, the liquid portion of the deoxygenated effluent can contain 50 wt % or more of $C_{17+}$ n-paraffins, or 60 wt % or more, or 70 wt % or more, or 80 wt % or more, such as up to 95 wt % or possibly still higher.

Separation Between Hydrotreatment and Catalytic Dewaxing

In various aspects, a separation stage can be used to separate out impurities from the hydrotreated feedstock prior to passing the hydrotreated feedstock to the isomerization/dewaxing reactor. In particular, the separation process minimizes the amount of $H_2O$ and CO that is slipped into the isomerization/dewaxing reactor by separating the gas and liquid phases within the hydrotreated feedstock. While an interstage stripper is preferred for this purpose, any suitable separation device can be used, such as, for example, any suitable type of separator or fractionator that is configured to separate gas-phase products from liquid-phase products.

In some aspects, the gas phase exiting the separation device can be recycled and combined with the hydrogen-rich treat gas that is fed into the hydrotreatment reactor. In addition, in various aspects, a portion of the liquid phase exiting the separation stage can be recycled back into the hydrotreatment reactor to provide improved heat release control for the hydrotreatment reactor.

Catalytic Dewaxing

In various aspects, at least a portion of the deoxygenated effluent is then exposed to catalyst based on a 10-member ring, one-dimensional zeotype framework structure. In this discussion, a zeotype is defined to refer to a crystalline material having a porous framework structure built from tetrahedra atoms connected by bridging oxygen atoms. Examples of known zeotype frameworks are given in the "Atlas of Zeolite Frameworks" published on behalf of the Structure Commission of the International Zeolite Association", $6^{th}$ revised edition, Ch. Baerlocher, L. B. McCusker, D. H. Olson, eds., Elsevier, N.Y. (2007) and the corresponding web site, http://www.iza-structure.org/databases/. A zeolite refers to a type of zeotype that includes an aluminosilicate having a zeotype framework type, while zeotypes more generally also refer to crystalline structures having zeotype frameworks that may also containing oxides of heteroatoms different from silicon and aluminum. Such heteroatoms can include any heteroatom generally known to be suitable for inclusion in a zeotype framework, such as gallium, boron, germanium, phosphorus, zinc, and/or other transition metals that can substitute for silicon and/or aluminum in a zeotype framework. It is noted that under this definition, a zeotype can include materials such as silicoaluminophosphate (SAPO) materials, silicophosphate (SiPO) materials, or aluminophosphate (AlPO) materials. Examples of 10-member ring, one-dimensional zeotypes framework structures include, but are not limited to, ZSM-48, ZSM-23, ZSM-35 (ferrierite), EU-2, EU-11, ZBM-30, TON, and combinations thereof.

ZSM-48 is an example of a 10-member ring, one-dimensional zeotype of the MRE framework type. ZSM-48 based catalysts have a high selectivity for isomerization of paraffinic feeds relative to cracking. Thus, a ZSM-48 based catalyst can provide substantially complete isomerization of a paraffinic feed (such as a deoxygenated bio-derived feed) while reducing or minimizing cracking of the paraffinic carbon chains. In some aspects, the catalyst can consist essentially of ZSM-48, any optional binder, and a hydrogenation metal, so that less than 1.0 wt % or less of the catalyst (relative to the weight of the catalyst) corresponds to a zeotype structure different from an MRE framework structure, or less than 0.1 wt %, such as down to having substantially no zeotype content different from an MRE framework structure (0.01 wt % or less). In some aspects where a catalyst is based on ZSM-48, the ZSM-48 in the catalyst can have a silica to alumina ratio of 90:1 or less, or 75:1 or less, such as down to 60:1 or possibly still lower.

Optionally but preferably, the dewaxing catalyst can include a binder, such as alumina, titania, silica, silica-alumina, zirconia, or a combination thereof, for example alumina and/or titania or silica and/or zirconia and/or titania. The relative amount of zeotype and binder can be any convenient amount. In some aspects where a binder is present, the catalyst can include 1.0 wt % to 85 wt % of a binder and/or can include 15 wt % to 99 wt % of a zeotype framework structure material.

In addition to a zeotype framework structure material (such as ZSM-48) and optional binder, the dewaxing catalyst can also include at least one metal hydrogenation component selected from Pd, Pt, or a combination thereof. When a metal hydrogenation component is present, the dewaxing catalyst can include 0.1 wt % to 10 wt % of the Pt, Pd, or combination thereof, or 0.1 wt % to 5.0 wt %, or 0.5 wt % to 10 wt %, or 0.5 wt % to 5.0 wt %, or 1.0 wt % to 10 wt %, or 1.0 wt % to 5.0 wt %.

The isomerization/dewaxing reactor may include any suitable type of reactor arranged in any suitable configuration. For example, in some embodiments, the isomerization/dewaxing reactor is a fixed-bed adiabatic reactor or a trickle-bed reactor that is loaded with the ZSM-48-based isomerization/dewaxing catalyst.

The deoxygenated feedstock (or at least a portion thereof, such as the liquid product portion) is exposed to the zeotype-based isomerization/dewaxing catalyst under effective isomerization/dewaxing conditions. In various aspects, effective isomerization/dewaxing conditions include a total pressure of 200 psig (1.4 MPa-g) to 2000 psig (14 MPa-g), a WABT of 300° C. to 400° C., a treat gas rate of 200 scf/bbl to 10,000 scf/bbl (~34 Nm$^3$/m$^3$ to 1700 Nm$^3$/m$^3$), and an LHSV of 1.0 hr$^{-1}$ to 10.0 hr$^{-1}$ (relative to the volume of the dewaxing catalyst). These conditions can be selected to provide sufficient severity so that substantially complete dewaxing occurs for the n-paraffins in the deoxygenated effluent.

In some aspects, in addition to selecting conditions with sufficient severity to achieve substantially complete dewaxing, the conditions can also be selected to reduce or minimize cracking of the deoxygenated effluent. In such aspects, the isomerization/dewaxing conditions include a total pressure of 200 psig (1.4 MPa-g) to 800 psig (10.3 MPa-g), a WABT of 300° C. to 350° C., a treat gas rate of 200 scf/bbl to 10,000 scf/bbl (~34 Nm$^3$/m$^3$ to 1700 Nm$^3$/m$^3$), and an LHSV of 1.0 hr$^{-1}$ to about 8.0 hr$^{-1}$ (relative to the volume of the dewaxing catalyst).

In some aspects where the dewaxing catalyst is based on ZSM-48, the severity of the reaction conditions can be characterized based on a severity index. The severity index is an integer that can be calculated in the following manner. For the weighted average bed temperature, for each 10° C. greater than 305° C., the severity index is increased by one. For pressure, for each 200 psi (0.7 MPa) that the pressure is greater than 400 psig (2.8 MPa-g), the severity index is increased by one. For space velocity, for each 1.0 hr$^{-1}$ that the LHSV is less than 5.0 hr$^{-1}$, the severity index is increased by one. A severity index of two or less corresponds to conditions that are likely insufficient to achieve substantially complete dewaxing. A severity index of 10 or more corresponds to conditions that are likely to result in excess cracking of the deoxygenated effluent. The severity index is designed to measure severity within the effective reaction conditions described above for isomerization/dewaxing. Thus, even though some combinations with temperatures of 350° C. or higher could potentially have a severity index of less than 10, such conditions are not preferred when avoiding cracking. In some aspects, the severity index can be 3 to 9, or 3 to 7.

In various aspects, after hydrotreating and catalytic dewaxing, the oxygen content of the liquid dewaxing effluent can be less than 10 wppm, or less than 2.0 wppm, such as down to having substantially no oxygen content (1.0 wppm or less).

Separation of the Dewaxing Effluent

In various aspects, because a diesel boiling range product does not need to be separated from the dewaxing effluent, a simple separation scheme can be used to recover the jet boiling range product from the dewaxing effluent. For example, a separation can be performed to separate the dewaxing effluent into a jet boiling range fraction and a lower boiling range fraction. The lower boiling range fraction can optionally undergo further separations to form at least one naphtha fraction and one or more light ends fractions. However, such additional separations on the lower boiling portion are not needed to recover the jet boiling range product fraction.

Properties of Jet Boiling Range Product

In various aspects, the jet boiling range product can have one or more of the following properties. The jet boiling range product can have a T10 distillation point of 205° C. or less and a final boiling point of 310° C. or less, or 300° C. or less. The jet boiling range product can have a density at 15° C. of 760 kg/m$^3$ or more, or 765 kg/m$^3$ or more, or 768 kg/m$^3$ or more, or 770 kg/m$^3$ or more, such as up to 772 kg/m$^3$ or possibly still higher. The jet boiling range product can have a freeze point of −40° C. or less, or −47° C. or less, or −50° C. or less, such as down to −100° C. or possibly still lower. The jet boiling range product can have a flash point of 38° C. or higher, or 40° C. or higher, or 45° C. or higher, such as up to 80° C. or possibly still higher. In some aspects, the yield of jet boiling range product can be 70 wt % or more relative to the weight of the input feed to the dewaxing stage, or 75 wt % or more, or 80 wt % or more, or 86 wt % or more, such as up to 92 wt % or possibly still higher.

In some aspects, the resulting jet boiling range product can have an unexpectedly high content of $C_{17}$-$C_{18}$ hydrocarbons. In such aspects, the jet boiling range fraction can contain 30 wt % or more of $C_{17}$-$C_{18}$ hydrocarbons, or 40 wt % or more, or 50 wt % or more, or 60 wt % or more, such as up to 80 wt % or possibly still higher. Additionally or alternatively, the jet boiling range fraction can contain 45 wt % or less of $C_{14}$-$C_{17}$ hydrocarbons, or 40 wt % or less, or 35 wt % or less, such as down to 25 wt % or possibly still lower.

In addition to the above, in some aspects, the jet boiling range fraction can satisfy one or more of the following specifications from ASTM D7566 (Annex 2). Examples of property specifications and/or typical properties include a total acidity of 0.015 mg KOH/g or less, a sulfur content of 15 wppm or less, a freezing point of −40° C. or less, a flash point of 38° C. or higher, a T10 distillation point of 205° C. or less, and/or a final boiling point of 300° C. or less. Another example of a property specification is a specification for a maximum pressure increase during a thermal stability test at 325° C. (according to ASTM D3241), such as a maximum pressure increase of 25 mm Hg.

It is noted that due to the bio-derived nature of the jet boiling range fraction, the sulfur content of the jet boiling range can be relatively low, such as being substantially free of sulfur. Thus, in some aspects, the sulfur content of the jet boiling range fraction can be 100 wppm or less, or 10 wppm or less, such as down to having substantially no sulfur content (0.1 wppm or less). Similarly, due to the hydrodeoxygenation and dewaxing steps, the oxygen content of the jet boiling range fraction can be relatively low, such as substantially free of oxygen. Thus, in some aspects, the oxygen content of the jet boiling range fraction can be 100 wppm or less, or 10 wppm or less, or 5.0 wppm or less, or 1.0 wppm or less, such as down to having substantially no oxygen content (0.1 wppm or less).

Configuration Example

The FIGURE shows an example of a reaction system 100 for producing a renewable jet boiling range product. As shown in the FIGURE, a bio-derived feedstock 102 is introduced into a hydrotreatment reactor 104. A first portion 106 of a hydrogen-rich treat gas stream 108 is also introduced into the hydrotreatment reactor 104. It will be appreciated by one of skill in the art that, while the hydrogen-rich treat gas stream 108 is depicted in the FIGURE as entering the top of the hydrotreatment reactor 104, this is for the sake of simplicity only. In operation, the hydrogen-rich treat gas stream 108 may be introduced into the hydrotreatment reactor 104 at various locations, such as at quench locations corresponding to each reactor bed.

The bio-derived feedstock 102 is then exposed to effective hydrotreatment conditions in the hydrotreatment reactor 104 in the presence of one or more catalyst beds that contain a suitable hydrotreating catalyst, resulting in the generation of a hydrotreated feedstock 110. At least a portion of the hydrotreated feedstock 110 exiting the hydrotreatment reactor is then introduced into a separation device 112, such as an interstage stripper. Within the separation device 112, a gas product portion is separated from liquid product portion. The gas product portion is then output as a first overhead stream 114 that can optionally be recycled and combined with the first portion 106 of the hydrogen-rich treat gas stream 108 entering the hydrotreatment reactor 104. In addition, the liquid product portion corresponds to liquid stream 116.

As shown in the FIGURE, some portion of the liquid stream 116 may (optionally) be recycled back into the hydrotreatment reactor 104 to provide heat release control for the hydrotreatment reactor 104. The rest of the liquid stream 116 (or the entirety of the liquid stream 116 for embodiments that do not include liquid recycling) is then introduced into an isomerization/dewaxing reactor 118. A second portion 120 of the hydrogen-rich treat gas stream 108 is also introduced into the isomerization/dewaxing reactor 118. It will be appreciated by one of skill in the art that, while the hydrogen-rich treat gas stream 108 is depicted in the FIGURE as entering the top of the isomerization/dewaxing reactor 118, this is for the sake of simplicity only. In operation, the hydrogen-rich treat gas stream 108 may be introduced into the isomerization/dewaxing reactor 118 at various locations, such as at the quench locations corresponding to each reactor bed.

Within the isomerization/dewaxing reactor 118, the liquid stream 116 is exposed to suitable catalytic isomerization/dewaxing conditions in the presence of one or more catalyst beds that contain a ZSM-48-based isomerization/dewaxing catalyst, resulting in the generation of an isomerized product stream 122. Finally, the isomerized product stream 122 exiting the isomerization/dewaxing reactor 118 is flowed through a separator 124. Within the separator 124, the isomerized product stream 122 is separated into a lower boiling fraction 126 and a jet boiling range product 130. Optionally, a portion of the overhead gas 128 from the isomerization/dewaxing reactor 118 can be in a manner similar to first overhead stream 114. The schematic view of the reaction system in the FIGURE is not intended to indicate that the reaction system 100 is required to include all of the components shown in the FIGURE, or that the reaction system 100 is limited to only the components shown in the FIGURE. Rather, any number of components may be omitted from the reaction system 100, or added to the reaction system 100, depending on the details of the specific implementation. For example, in some embodiments, the separation device 112 is omitted from the reaction system 100, and the hydrotreated feedstock is passed directly from the hydrotreatment reactor 104 to the isomerization/dewaxing reactor 118. Moreover, in some embodiments, multiple hydrotreatment reactors and/or multiple isomerization/dewaxing reactors are included within the reaction system 100. Furthermore, it will be appreciated that the reaction system 100 is susceptible to any number of other modifications or variations without changing the overall technical effect of the system. For example, while the reaction system 100 is depicted as including separate hydrotreatment and isomerization/dewaxing reactors 104 and 118, respectively, one of skill in the art will appreciate that the hydrotreatment and isomerization/dewaxing stages can alternatively be combined into a single reactor without changing the overall technical effect of the reaction system 100.

EXAMPLES

A series of dewaxing processes were performed in a pilot scale reactor using a model feed. The pilot scale reactor was a down flow reactor. A Pt/ZSM-48 bound catalyst was used that included 0.6 wt % Pt relative to the weight of the catalyst. The ZSM-48 had a silica to alumina ratio of roughly 70:1. The model feed was a blend n-paraffins corresponding to $C_{15}$-$C_{18}$ paraffins, and therefore corresponds to a feed that has already been deoxygenated. The model feed is believed to be representative of a type of renewable diesel. The properties of the feed are shown in Table 1.

TABLE 1

Feedstock Characterization

| Method | Description | Unit | |
|---|---|---|---|
| 1747 | Hydrogen | mass % | 14.92 |
| AMS1208 | Nitrogen | ppm | <2.5 |
| D2622 | Sulfur | ppm | <5 |
| B3942 | Calculated density 15° C. | g/cm$^3$ | 0.7887 |
| D2887 | .5 PCT OFF - SIMDIS | ° F./° C. | 516/269 |
| D2887 | 10 PCT OFF - SIMDIS | ° F./° C. | 575/301 |
| D2887 | 20 PCT OFF - SIMDIS | ° F./° C. | 579/304 |
| D2887 | 30 PCT OFF - SIMDIS | ° F./° C. | 585/307 |
| D2887 | 40 PCT OFF - SIMDIS | ° F./° C. | 601/316 |
| D2887 | 50 PCT OFF - SIMDIS | ° F./° C. | 605/318 |
| D2887 | 60 PCT OFF - SIMDIS | ° F./° C. | 607/320 |
| D2887 | 70 PCT OFF - SIMDIS | ° F./° C. | 609/321 |
| D2887 | 80 PCT OFF - SIMDIS | ° F./° C. | 611/322 |
| D2887 | 90 PCT OFF - SIMDIS | ° F./° C. | 612/322 |
| D2887 | 99.5 PCT OFF - SIMDIS | ° F./° C. | 639/337 |
| D7346 | Cloud point | ° C. | 25 |
| M738 | Water | ppm | 44 |

It is noted that the boiling point of n-$C_{16}$ paraffin is 548° F. (287° C.) and the boiling point of n-$C_{17}$ paraffin is 576° F. (302° C.). Thus, based on the fractional weight distillation values in Table 1, the feed in Table 1 includes roughly 90 wt % or more of $C_{17+}$ n-paraffins, as indicated by the T10 distillation point of 574° F. (301° C.). Additionally, the boiling point of n-$C_{18}$ paraffin is 603° F. (317° C.) while the boiling point of n-$C_{19}$ paraffin is 624° F. (329° C.). As indicated by the T90 distillation point of 612.3° F. (322° C.) and the T99.5 distillation point of 638.8° F. (337° C.), the model feed included roughly 1.0 wt % of $C_{19+}$ n-paraffins.

Example 1

The feed from Table 1 was exposed to the Pt/ZSM-48 catalyst in the pilot scale reactor with the following conditions: pressure 610 psig (4.2 MPa-g), LHSV 4 hr$^{-1}$, temperature 640° F. (338° C.) and hydrogen treat gas to feed ratio 2000 scf/b (~340 Nm$^3$/m$^3$). This corresponds to a severity index of 6. Table 2 shows the product yields relative to the weight of the feed.

TABLE 2

Product yield from dewaxing

| | Yields |
|---|---|
| Hydrogen consumption, scf/b | 203 |
| $C_1$, wt % | 0.06 |
| $C_2$, wt % | 0.14 |
| $C_3$, wt % | 1.2 |
| $C_4$, wt % | 3.6 |
| Naphtha, wt % | 12 |
| Jet, wt % | 83 |

As shown in Table 2, the yield of the jet boiling range product was greater than 80 wt % relative to the input feed to the dewaxing reactor. It is noted that the jet boiling range fraction corresponds to the "bottoms" from the separation, as there is not a separate diesel fraction. Table 3 shows properties (D86 distillation, flash and freezing point) of the resulting jet boiling range product. The properties meet the ASTM D7566 (Annex 2) specifications.

TABLE 3

Properties of Jet Boiling Range Fraction

| Method | Description | Unit | Jet Product | ASTM D7566 Specification |
|---|---|---|---|---|
| D86 | .5 PCT OFF | ° F./° C. | 269/132 | |
| D86 | 10 PCT OFF | ° F./° C. | 313/156 | <401 Max |
| D86 | 20 PCT OFF | ° F./° C. | 339/171 | |
| D86 | 30 PCT OFF | ° F./° C. | 395/202 | |
| D86 | 40 PCT OFF | ° F./° C. | 452/234 | |
| D86 | 50 PCT OFF | ° F./° C. | 489/254 | |
| D86 | 60 PCT OFF | ° F./° C. | 509/265 | |
| D86 | 70 PCT OFF | ° F./° C. | 521/272 | |
| D86 | 80 PCT OFF | ° F./° C. | 528/276 | |
| D86 | 90 PCT OFF | ° F./° C. | 533/278 | |
| D86 | 99.5 PCT OFF | ° F./° C. | 538/281 | <300 |
| D5972 | Freezing Point | ° C. | −61 | <−40 |
| D6450 | Flash Point | ° C. | 43 | >38 |
| G22 | Density, 15° C. | kg/m3 | 730-772 | 769 |

As shown in Table 3, the jet boiling range fraction separated from the dewaxing effluent meets a variety of properties that are desirable for a jet fuel and/or jet fuel blending component. The final boiling point is less than 300° C., the freezing point is less than −60° C., and the flash point is greater than 40° C.

Example 2

In another processing run, the feed from Table 1 was exposed to the Pt/ZSM-48 catalyst in the pilot scale reactor with the following conditions: pressure 605 psig (4.1 MPa-g), LHSV 4 hr$^{-1}$, temperature 620° F. (327° C.) and hydrogen treat gas to feed ratio 2000 scf/b (~340 Nm$^3$/m$^3$). This corresponds to a severity index of 5. Table 4 shows the product yields relative to the weight of the feed.

TABLE 4

Product yield from dewaxing

| | Yields |
|---|---|
| Hydrogen consumption, scf/b | 134 |
| $C_1$, wt % | 0.03 |
| $C_2$, wt % | 0.07 |
| $C_3$, wt % | 0.82 |
| $C_4$, wt % | 2.28 |
| Naphtha, wt % | 10.0 |
| Jet, wt % | 86.7 |

As shown in Table 4, the yield of the jet boiling range product was greater than 85 wt % relative to the input feed to the dewaxing reactor. It is noted that the jet boiling range fraction corresponds to the "bottoms" from the separation, as there is not a separate diesel fraction. Table 5 shows properties (D86 distillation, flash and freezing point) of the resulting jet boiling range product. The properties meet the ASTM D7566 (Annex 2) specifications.

TABLE 5

Properties of Jet Boiling Range Fraction

| Method | Description | Unit | Jet Product | ASTM D7566 Specification |
|---|---|---|---|---|
| D86 | .5 PCT OFF | ° F./° C. | 293/145 | |
| D86 | 10 PCT OFF | ° F./° C. | 341/172 | <401 Max |
| D86 | 20 PCT OFF | ° F./° C. | 374/190 | |
| D86 | 30 PCT OFF | ° F./° C. | 441/227 | |
| D86 | 40 PCT OFF | ° F./° C. | 485/252 | |
| D86 | 50 PCT OFF | ° F./° C. | 508/264 | |
| D86 | 60 PCT OFF | ° F./° C. | 520/271 | |
| D86 | 70 PCT OFF | ° F./° C. | 527/275 | |
| D86 | 80 PCT OFF | ° F./° C. | 532/278 | |
| D86 | 90 PCT OFF | ° F./° C. | 536/280 | |
| D86 | 99.5 PCT OFF | ° F./° C. | 537/281 | <300 |
| D5972 | Freezing Point | ° C. | −43 | <−40 |
| D6450 | Flash Point | ° C. | 53 | >38 |
| G22 | Density, 15° C. | kg/m3 | 730-772 | 772 |

As shown in Table 5, the jet boiling range fraction separated from the dewaxing effluent meets a variety of properties that are desirable for a jet fuel and/or jet fuel blending component. The final boiling point is less than 300° C., the freezing point is less than −40° C., and the flash point is greater than 50° C.

In addition to the characterization shown in Table 5, the carbon chain lengths for the paraffins in the jet fuel boiling range product were characterized. For the jet fuel boiling range fraction shown in Table 5, 62 wt % of the hydrocarbons in the fraction corresponded to $C_{17}$ and $C_{18}$ hydrocarbons. Based on the boiling range, substantially all of the $C_{17}$ and $C_{18}$ hydrocarbons corresponded to isoparaffins. Additionally, the weight percentage of $C_{14}$-$C_{17}$ hydrocarbons in the jet fuel boiling range fraction shown in Table 5 was only 35 wt %. This represents an unexpected distribution of carbon chains within a jet fuel and/or jet fuel blend component. Due in part to the high percentage of $C_{17}$ and $C_{18}$ hydrocarbons, the density of the jet boiling range fraction shown in Table 5 was 772 kg/m³.

Comparative Example 3

In still another processing run, the feed from Table 1 was exposed to the Pt/ZSM-48 catalyst in the pilot scale reactor with the following conditions: pressure 600 psig (4.1 MPa-g), LHSV 4 hr$^{-1}$, temperature 595° F. (313° C.) and hydrogen treat gas to feed ratio 2000 scf/b (~340 Nm³/m³). In part due to the lower temperature, this corresponds to a severity index of 3. As a result, the severity was too low to achieve deep dewaxing. Due to the lower severity, a substantial portion of n-paraffins remained in the dewaxed effluent, so an additional separation was performed to separate a diesel boiling range fraction from the jet boiling range fraction. Thus, these conditions would not be suitable for forming a jet boiling range fraction without having a separation to remove heavier hydrocarbons.

Due to the lack of full isomerization of the $C_{17}$ and $C_{18}$ paraffins in the input feed to the dewaxing stage, the jet yield was less than 80 wt %. Additionally, the density of the resulting jet boiling range fraction was lower, at 759 kg/m³. The distribution of carbon chain lengths in the resulting jet fraction was also substantially different, as only 17 wt % of the jet fraction corresponded to $C_{17}$ and $C_{18}$ hydrocarbons.

Additional Embodiments

Embodiment 1. A method for producing a renewable jet boiling range fraction, comprising: contacting a bio-derived feedstock with a hydrotreatment catalyst under effective hydrotreatment conditions to produce a deoxygenated effluent comprising a deoxygenated liquid fraction; contacting at least a portion of the deoxygenated liquid fraction with a dewaxing catalyst comprising a 10-member ring, one-dimensional zeotype framework structure and Pt, Pd, or a combination thereof under effective dewaxing conditions comprising a weighted average bed temperature of 300° C. or more to produce an isomerized effluent; and separating the isomerized effluent to form a jet boiling range fraction as a bottoms fraction and one or more lower boiling fractions, the jet boiling range fraction comprising a T90 distillation point of 300° C. or less, a freeze point of −40° C. or less, and a flash point of 38° C. or more.

Embodiment 2. The method of Embodiment 1, wherein a yield of the jet boiling range fraction is 70 wt % or more relative to a weight of the at least a portion of the deoxygenated liquid fraction.

Embodiment 3. The method of any of the above embodiments, wherein the jet boiling range fraction comprises 1.0 wppm or less of oxygen.

Embodiment 4. The method of any of the above embodiments, wherein the jet boiling range fraction comprises a final boiling point of 300° C. or less.

Embodiment 5. The method of any of the above embodiments, wherein the jet boiling range fraction comprises 40 wt % or more of $C_{17}$-$C_{18}$ hydrocarbons.

Embodiment 6. The method of Embodiment 5, wherein the bio-derived feedstock comprises 50 wt % or more of $C_{17+}$ carbon chains.

Embodiment 7. The method of any of the above embodiments, wherein the bio-derived feedstock comprises 5.0 wt % or less of $C_{19+}$ carbon chains.

Embodiment 8. The method of any of the above embodiments, wherein the at least a portion of the deoxygenated effluent comprises 50 wt % or more of $C_{17+}$ n-paraffins.

Embodiment 9. The method of any of the above embodiments, wherein the jet boiling range fraction comprises less than 50 wt % of $C_{14}$-$C_{17}$ hydrocarbons.

Embodiment 10. The method of any of the above embodiments, wherein the ten-member ring, one-dimensional zeotype framework structure comprises ZSM-48, and wherein the dewaxing catalyst comprises 0.1 wt % to 2.0 wt % of Pt, Pd, or a combination thereof, relative to a weight of the dewaxing catalyst, the dewaxing catalyst optionally further comprising a binder.

Embodiment 11. The method of any of the above embodiments, wherein the
effective dewaxing conditions comprise a weighted average bed temperature of 300° C. to 350° C., a pressure of 1.4 MPa-g to 14 MPa-g, and a LHSV of 1.0 hr$^{-1}$ to 8.0 hr$^{-1}$ relative to a volume of dewaxing catalyst, the effective dewaxing conditions optionally comprising a severity index of 3 to 9.

Embodiment 12. The method of any of the above embodiments, wherein contacting the bio-derived feedstock with a hydrotreatment catalyst further comprises contacting at least a portion of the deoxygenated effluent with the hydrotreatment catalyst.

Embodiment 13. The method of any of the above embodiments, wherein the at least a portion of the deoxygenated liquid fraction is exposed to the dewaxing catalyst without exposing a liquid portion of the isomerized effluent to the dewaxing catalyst, or wherein exposing the at least a portion of the deoxygenated liquid fraction to the dewaxing catalyst further comprises exposing at least a portion of the jet boiling range fraction to the dewaxing catalyst.

Embodiment 14. The method of any of the above embodiments, wherein a density of the jet boiling range fraction is 765 kg/m$^3$ to 772 kg/m$^3$.

Embodiment 15. The method of any of the above embodiments, further comprising separating the deoxygenated liquid fraction from the deoxygenated effluent.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for producing a renewable jet boiling range fraction, comprising:
    contacting a bio-derived feedstock with a hydrotreatment catalyst under effective hydrotreatment conditions to produce a deoxygenated effluent comprising a deoxygenated liquid fraction, the bio-derived feedstock comprising 70 wt % or more of $C_{17+}$ carbon chains;
    contacting at least a portion of the deoxygenated liquid fraction with a dewaxing catalyst comprising ZSM-48 and Pt, Pd, or a combination thereof under effective dewaxing conditions to produce an isomerized effluent, the effective dewaxing conditions comprising a severity index of 3 to 9, a weighted average bed temperature of 300° C. to 350° C., a pressure of 1.4 MPa-g to 14 MPa-g, and a LHSV of 1.0 hr$^{-1}$ to 8.0 hr$^{-1}$ relative to a volume of dewaxing catalyst; and
    separating the isomerized effluent to form a jet boiling range fraction as a bottoms fraction and one or more lower boiling fractions, the jet boiling range fraction comprising a T90 distillation point of 300° C. or less, a freeze point of −40° C. or less, 40 wt % or more of $C_{17}$-$C_{18}$ hydrocarbons and 45 wt % or less of $C_{14}$-$C_{17}$ hydrocarbons, and a flash point of 38° C. or more.

2. The method of claim 1, wherein a yield of the jet boiling range fraction is 70 wt % or more relative to a weight of the at least a portion of the deoxygenated liquid fraction.

3. The method of claim 1, wherein the jet boiling range fraction comprises 1.0 wppm or less of oxygen.

4. The method of claim 1, wherein the jet boiling range fraction comprises a final boiling point of 300° C. or less.

5. The method of claim 1, wherein the bio-derived feedstock comprises 5.0 wt % or less of $C_{19+}$ carbon chains.

6. The method of claim 1, wherein the at least a portion of the deoxygenated effluent comprises 50 wt % or more of $C_{17+}$ n-paraffins.

7. The method of claim 1, wherein contacting the bio-derived feedstock with a hydrotreatment catalyst further comprises contacting at least a portion of the deoxygenated effluent with the hydrotreatment catalyst.

8. The method of claim 1, wherein the at least a portion of the deoxygenated liquid fraction is exposed to the dewaxing catalyst without exposing a liquid portion of the isomerized effluent to the dewaxing catalyst.

9. The method of claim 1, wherein exposing the at least a portion of the deoxygenated liquid fraction to the dewaxing catalyst further comprises exposing at least a portion of the jet boiling range fraction to the dewaxing catalyst.

10. The method of claim 1, wherein a density of the jet boiling range fraction is 765 kg/m$^3$ to 772 kg/m$^3$.

11. The method of claim 1, wherein the dewaxing catalyst comprises 0.1 wt % to 2.0 wt % of Pt, Pd, or a combination thereof, relative to a weight of the dewaxing catalyst.

12. The method of claim 1, wherein the dewaxing catalyst further comprises a binder.

13. The method of claim 1, further comprising separating the deoxygenated liquid fraction from the deoxygenated effluent.

14. A method for producing a renewable jet boiling range fraction, comprising:
    contacting a bio-derived feedstock with a hydrotreatment catalyst under effective hydrotreatment conditions to produce a deoxygenated effluent comprising a deoxygenated liquid fraction, the bio-derived feedstock comprising 70 wt % or more of $C_{17+}$ carbon chains;
    contacting at least a portion of the deoxygenated liquid fraction with a dewaxing catalyst comprising ZSM-48 and Pt, Pd, or a combination thereof under effective dewaxing conditions to produce an isomerized effluent, the effective dewaxing conditions comprising a severity index of 3 to 9, a weighted average bed temperature of 300° C. to 350° C., a pressure of 1.4 MPa-g to 14 MPa-g, and a LHSV of 1.0 hr$^{-1}$ to 8.0 hr$^{-1}$ relative to a volume of dewaxing catalyst; and
    separating the isomerized effluent to form a jet boiling range fraction and one or more additional fractions, the jet boiling range fraction comprising a T90 distillation point of 300° C. or less, a freeze point of −40° C. or less, 40 wt % or more of $C_{17}$-$C_{18}$ hydrocarbons and 45 wt % or less of $C_{14}$-$C_{17}$ hydrocarbons, and a flash point of 38° C. or more.

15. The method of claim 14, wherein a yield of the jet boiling range fraction is 70 wt % or more relative to a weight of the at least a portion of the deoxygenated liquid fraction.

16. The method of claim 14, wherein the jet boiling range fraction comprises 1.0 wppm or less of oxygen.

17. The method of claim 14, wherein the jet boiling range fraction comprises a final boiling point of 300° C. or less.

18. The method of claim 14, wherein the bio-derived feedstock comprises 5.0 wt % or less of $C_{19+}$ carbon chains.

19. The method of claim 14, wherein the at least a portion of the deoxygenated effluent comprises 50 wt % or more of $C_{17+}$ n-paraffins.

* * * * *